United States Patent
Kim et al.

(10) Patent No.: US 12,165,811 B2
(45) Date of Patent: Dec. 10, 2024

(54) MULTILAYER CERAMIC CAPACITOR INCLUDING SIDE MARGIN PORTION HAVING MAGNESIUM CONTENT DIFFERENT THAN COVER PORTION

(71) Applicant: SAMSUNG ELECTRO-MECHANICS CO., LTD., Suwon-si (KR)

(72) Inventors: Chang Suek Kim, Suwon-si (KR); Dong Su Cho, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 0 days.

(21) Appl. No.: 18/124,783

(22) Filed: Mar. 22, 2023

(65) Prior Publication Data

US 2023/0223193 A1 Jul. 13, 2023

Related U.S. Application Data

(63) Continuation of application No. 17/097,313, filed on Nov. 13, 2020, now Pat. No. 11,682,524.

(30) Foreign Application Priority Data

Dec. 24, 2019 (KR) .................. 10-2019-0173854

(51) Int. Cl.
*H01G 4/224* (2006.01)
*H01G 4/30* (2006.01)
*H01G 13/00* (2013.01)

(52) U.S. Cl.
CPC .............. *H01G 4/224* (2013.01); *H01G 4/30* (2013.01); *H01G 13/00* (2013.01)

(58) Field of Classification Search
CPC .......... H01G 4/224; H01G 4/30; H01G 13/00; H01G 4/012; H01G 4/12; H01G 4/1209; H01G 4/005
See application file for complete search history.

(56) References Cited

U.S. PATENT DOCUMENTS

| | | |
|---|---|---|
| 2008/0304204 A1 | 12/2008 | Suzuki |
| 2015/0036264 A1 | 2/2015 | Morita et al. |

(Continued)

FOREIGN PATENT DOCUMENTS

| | | |
|---|---|---|
| CN | 109671565 A | 4/2019 |
| JP | H07-122455 A | 5/1995 |

(Continued)

OTHER PUBLICATIONS

Office Action issued in corresponding U.S. Appl. No. 17/097,313 dated May 23, 2022.

(Continued)

*Primary Examiner* — David M Sinclair
*Assistant Examiner* — Daniel M Dubuisson
(74) *Attorney, Agent, or Firm* — MORGAN, LEWIS & BOCKIUS LLP

(57) ABSTRACT

A multilayer ceramic capacitor includes a ceramic body including a dielectric layer, a plurality of internal electrodes disposed inside the ceramic body and each exposed to first and second surfaces of the ceramic body and to one of the third and fourth surfaces, and a first side margin portion and a second side margin portion disposed on sides of the plurality of internal electrodes exposed to the first and second surfaces. The ceramic body includes an active portion including the plurality of internal electrodes disposed to overlap each other with the dielectric layer interposed therebetween to form capacitance, an upper cover portion disposed above the active portion, and a lower cover portion (Continued)

disposed below the active portion. The first and second side margin portions have a dielectric composition different from a dielectric composition of one of the upper cover portion and the lower cover portion.

23 Claims, 6 Drawing Sheets

(56) References Cited

U.S. PATENT DOCUMENTS

| | | |
|---|---|---|
| 2015/0340156 A1 | 11/2015 | Masunari et al. |
| 2017/0040111 A1 | 2/2017 | Kim et al. |
| 2017/0092424 A1 | 3/2017 | Morito et al. |
| 2017/0278635 A1 | 9/2017 | Mizuno et al. |
| 2018/0061575 A1 | 3/2018 | Mizuno |
| 2018/0261390 A1 | 9/2018 | Sakate et al. |
| 2019/0035554 A1 | 1/2019 | Inomata et al. |
| 2019/0115153 A1 | 4/2019 | Park et al. |
| 2019/0371528 A1* | 12/2019 | Takashima ............. H01G 4/232 |
| 2020/0051739 A1 | 2/2020 | Park et al. |
| 2020/0152382 A1 | 5/2020 | Sakurai et al. |
| 2020/0161051 A1 | 5/2020 | Tanaka et al. |
| 2020/0312567 A1 | 10/2020 | Sakai |
| 2021/0005382 A1 | 1/2021 | Park et al. |

FOREIGN PATENT DOCUMENTS

| | | |
|---|---|---|
| JP | 2010-103566 A | 5/2010 |
| JP | 2016-001723 A | 1/2016 |
| JP | 2017-11172 A | 1/2017 |
| JP | 2019-009265 A | 1/2019 |
| KR | 10-2010-0136917 A | 12/2010 |
| KR | 10-2019-0116119 A | 10/2019 |
| KR | 10-2019-0121139 A | 10/2019 |

OTHER PUBLICATIONS

Final Office Action issued in corresponding U.S. Appl. No. 17/097,313 dated Nov. 14, 2022.
Notice of Allowance issued in corresponding U.S. Appl. No. 17/097,313 dated Feb. 27, 2023.
Office Action issued in corresponding Japanese Patent Application No. 2020-192052 dated Jan. 30, 2024, with English translation.
Office Action issued in corresponding Chinese Patent Application No. 202011501323.0 dated Apr. 16, 2024, with English translation.
Office Action dated Jul. 2, 2024, issued in corresponding Japanese Patent Application No. 2023-060598 with an English translation.

* cited by examiner

MULTILAYER CERAMIC CAPACITOR INCLUDING SIDE MARGIN PORTION HAVING MAGNESIUM CONTENT DIFFERENT THAN COVER PORTION

CROSS-REFERENCE TO RELATED APPLICATIONS

This application is the continuation application of U.S. patent application Ser. No. 17/097,313 filed on Nov. 13, 2020, which claims benefit under 35 USC 119(a) of Korean Patent Application No. 10-2019-0173854 filed on Dec. 24, 2019 in the Korean Intellectual Property Office, the entire disclosures of which are incorporated herein by reference for all purposes.

BACKGROUND

1. Field

The present disclosure relates to a multilayer ceramic capacitor in which reliability may be improved, and a method of manufacturing the same.

2. Description of Related Art

In general, electronic components using a ceramic material, such as capacitors, inductors, piezoelectric elements, varistors, or thermistors, include a ceramic body formed of a ceramic material, an internal electrode formed inside the body, and an external electrode disposed on the surface of the ceramic body to be connected to the internal electrode.

Recently, as electronic products have been miniaturized and multifunctionalized, chip components have been also miniaturized and highly functionalized. As part of these trends, multilayer ceramic capacitors are required to have high capacity with small sizes.

Miniaturization and high capacitance of multilayer ceramic capacitors require significantly increasing the effective electrode area (increasing the effective volume fraction providing capacitance).

To implement a small and high capacity multilayer ceramic capacitor as described above, in manufacturing a multilayer ceramic capacitor, the internal electrode may be exposed in the width direction of the body, thereby significantly increasing the internal electrode area in the width direction through a marginless design. For example, in the pre-firing stage, after manufacturing such a chip, a method is used to separately attach a side margin portion to the widthwise electrode exposed surface of the chip to complete a multilayer ceramic capacitor.

However, in this method, in the process of forming the side margin portion, a relatively large number of voids are generated at the interface between the ceramic body and the side margin portion, thereby reducing reliability.

Furthermore, electric field concentration occurs due to voids generated at the interface between the ceramic body and the side margin portion, thereby causing a problem of lowering the breakdown voltage (BDV).

In addition, the voids may cause a decrease in moisture resistance reliability due to a decrease in outer sintered densities.

In addition, as the interface junction is generated at the boundary between the side margin portion and the body, a decrease in bonding strength and consequently, a decrease in moisture resistance reliability, may be caused.

Therefore, research is needed to prevent the breakdown voltage (BDV) degradation and the moisture resistance reliability degradation in small and high capacity products.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a multilayer ceramic capacitor in which reliability may be improved, and a method of manufacturing the same.

According to an aspect of the present disclosure, a multilayer ceramic capacitor includes a ceramic body including a dielectric layer, the ceramic body having first and second surfaces opposing each other, third and fourth surfaces opposing each other and connecting the first and second surfaces, and fifth and sixth surfaces connected to the first to fourth surfaces and opposing each other. A plurality of internal electrodes are disposed inside the ceramic body to overlap each other with the dielectric layer interposed therebetween, and each exposed to the first and second surfaces and to one of the third and fourth surfaces. A first side margin portion and a second side margin portion are disposed on sides of the plurality of internal electrodes exposed to the first and second surfaces. The ceramic body includes an active portion including the plurality of internal electrodes disposed to overlap each other with the dielectric layer interposed therebetween to form capacitance, an upper cover portion disposed above the active portion, and a lower cover portion disposed below the active portion. The first and second side margin portions have a dielectric composition different from a dielectric composition of one of the upper cover portion and the lower cover portion.

According to an aspect of the present disclosure, a method of manufacturing a multilayer ceramic capacitor includes preparing a first ceramic green sheet on which a plurality of first internal electrode patterns are spaced apart from each other at a predetermined interval and a second ceramic green sheet on which a plurality of second internal electrode patterns are spaced apart from each other at a predetermined interval, laminating the first ceramic green sheet and the second ceramic green sheet in such a manner that the plurality of first internal electrode patterns and the plurality of second internal electrode patterns overlap each other, and forming a ceramic green sheet laminated body in which a lower cover portion is formed by laminating a plurality of ceramic green sheets on a lower portion of a laminated body. The ceramic green sheet laminated body is cut to have side surfaces to which edges of the plurality of first internal electrode patterns and the plurality of second internal electrode patterns are exposed in a width direction, and a first side margin portion, a second side margin portion, and an upper cover portion are formed integrally with each other on the side surfaces to which the edges of the plurality of first internal electrode patterns and the plurality of second internal electrode patterns are exposed and on an upper portion of the cut ceramic green sheet laminated body. The cut ceramic green sheet laminated body is fired to provide a ceramic body including an active portion having a dielectric layer and first and second internal electrodes, and a lower cover portion. The forming of the first side margin portion, the second side margin portion, and the upper cover portion is performed by adding a ceramic material to integrally form the first side margin portion, the second side margin portion, and the upper cover portion with each other.

According to another aspect of the present disclosure, a multilayer ceramic capacitor includes a ceramic body having first and second internal electrodes that are alternately stacked with dielectric layers therebetween, wherein the first and second internal electrodes are both exposed to opposing first and second surfaces of the ceramic body. Upper and lower cover portions are disposed above and below the ceramic body in a stacking direction of the first and second internal electrodes, and first and second side margin portions are respectively disposed on the opposing first and second surfaces of the ceramic body. The upper cover portion has a different dielectric composition than the lower cover portion.

According to a further aspect of the present disclosure, a multilayer ceramic capacitor includes a ceramic body having first and second internal electrodes that are alternately stacked with dielectric layers therebetween, wherein the first and second internal electrodes are both exposed to opposing first and second surfaces of the ceramic body. Upper and lower cover portions are disposed above and below the ceramic body in a stacking direction of the first and second internal electrodes, and first and second side margin portions are respectively disposed on the opposing first and second surfaces of the ceramic body. The first and second side margin portions have a different magnesium (Mg) content than one of the upper and lower cover portions.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Figure 1:
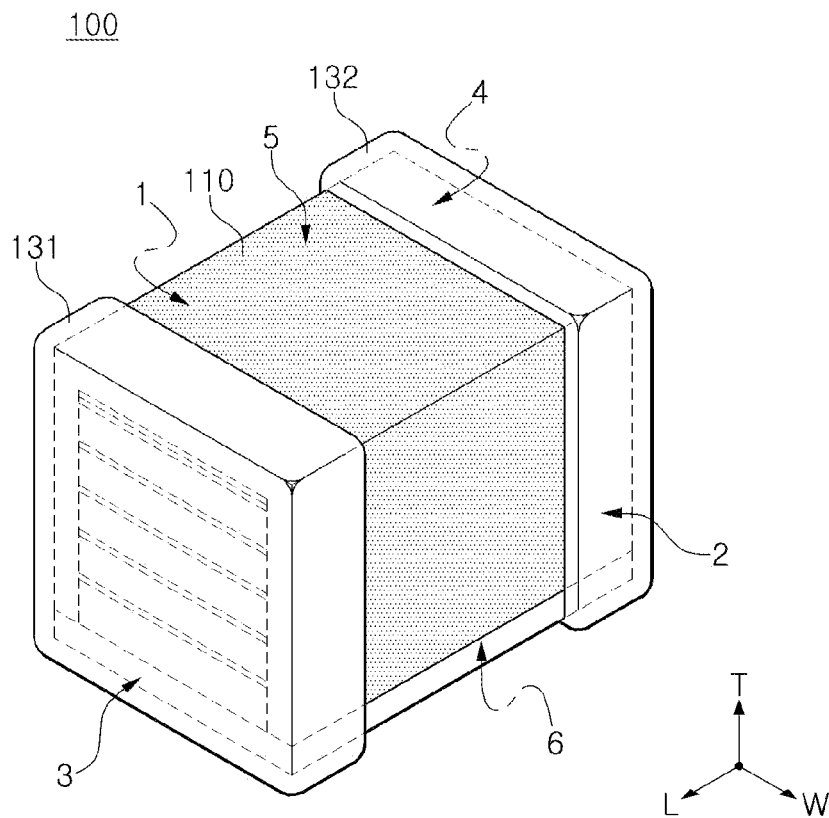
FIG. 1 is a schematic perspective view illustrating a multilayer ceramic capacitor according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's positional relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative size, proportions, and depiction of elements in the drawings may be exaggerated for clarity, illustration, and convenience.

Subsequently, examples are described in further detail with reference to the accompanying drawings.

FIG. 1 is a schematic perspective view illustrating a multilayer ceramic capacitor according to an embodiment.

Figure 2:
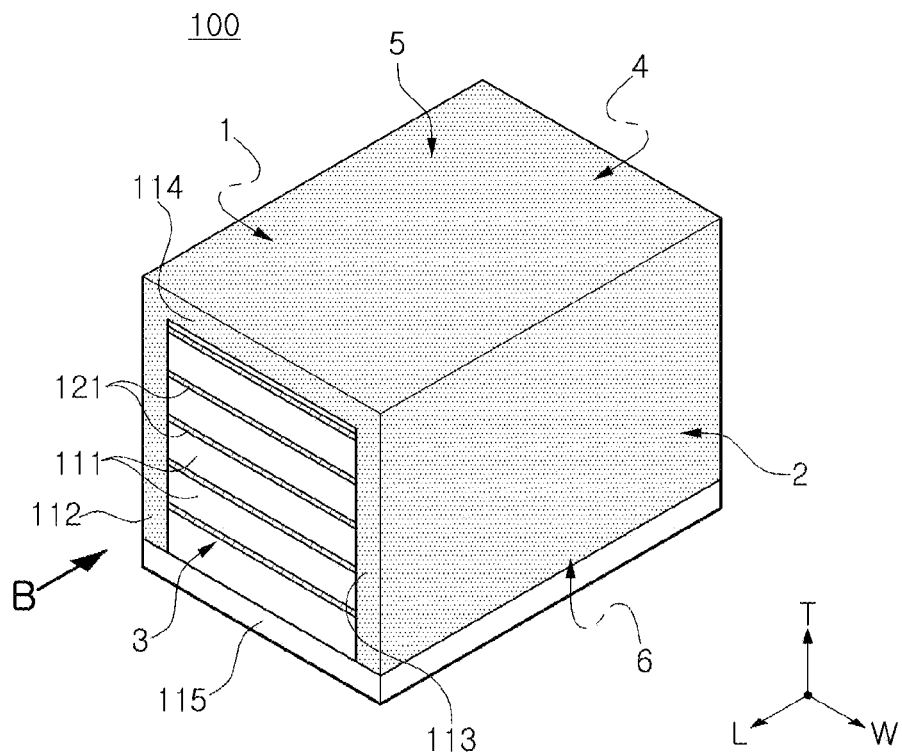
FIG. 2 is a perspective view illustrating an exterior of a ceramic body of FIG. 1.

FIG. 2 is a perspective view illustrating an exterior of a ceramic body of FIG. 1.

Figure 3:
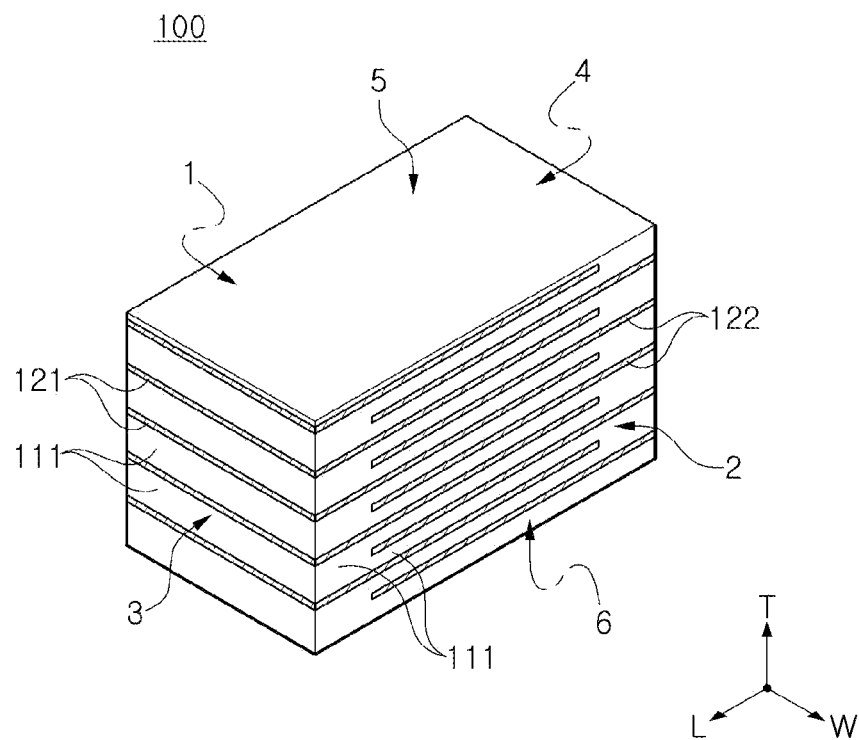
FIG. 3 is a perspective view illustrating a ceramic green sheet laminated body before firing of the ceramic body of FIG. 2.

FIG. 3 is a perspective view illustrating a ceramic green sheet laminated body before firing of the ceramic body of FIG. 2.

Figure 4:
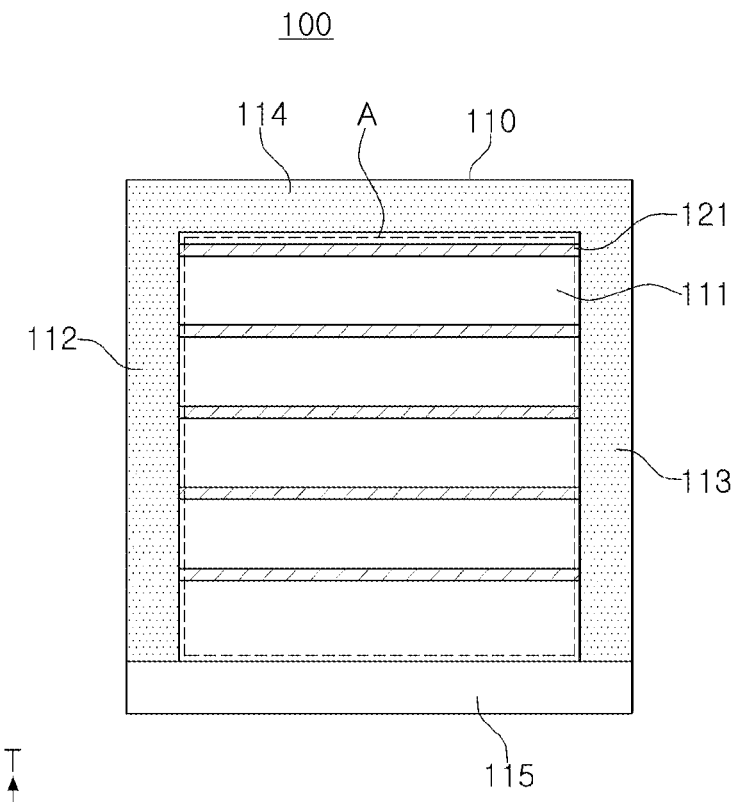
FIG. 4 is a side view taken in direction B of FIG. 2.

FIG. 4 is a side view taken in direction B of FIG. 2.

Referring to FIGS. 1 to 4, a multilayer ceramic capacitor 100 according to an embodiment includes a ceramic body 110, a plurality of internal electrodes 121 and 122 formed in the ceramic body 110, and external electrodes 131 and 132 formed on external surfaces of the ceramic body 110.

The ceramic body 110 may have a first surface 1 and a second surface 2 opposing each other, a third surface 3 and a fourth surface 4 connecting the first and second surfaces, and a fifth surface 5 and a sixth surface 6, which are an upper surface and a lower surface, respectively.

The first surface 1 and the second surface 2 oppose each other in the width direction of the ceramic body 110, and the third surface 3 and the fourth surface 4 oppose each other in the longitudinal direction. The fifth surface 5 and the sixth surface 6 may be defined as surfaces opposing each other in the thickness direction or stacking direction of the internal electrodes.

The shape of the ceramic body 110 is not particularly limited, but may be a rectangular parallelepiped shape as illustrated in the drawings.

One end of each of the plurality of internal electrodes 121 formed in the ceramic body 110 is exposed to the third surface 3, and one end of each of the plurality of internal electrodes 122 formed in the ceramic body 110 is exposed to the fourth surface 4 of the ceramic body.

The internal electrodes 121 and 122 may be provided as a pair of the first internal electrode 121 and the second internal electrode 122 having different polarities.

One end of each first internal electrode 121 may be exposed to the third surface 3, and one end of each second internal electrode 122 may be exposed to the fourth surface 4.

Another end of each first internal electrode 121 is disposed at a predetermined interval from the fourth surface 4, and another end of each second internal electrode 122 is disposed at a predetermined interval from the third surface 3.

First and second external electrodes 131 and 132 may be formed on the third surface 3 and the fourth surface 4 of the ceramic body to be electrically connected to the first and second internal electrodes 121 and 122, respectively.

The multilayer ceramic capacitor 100 according to an embodiment includes a plurality of internal electrodes 121 and 122 disposed inside the ceramic body 110, exposed to the first and second surfaces 1 and 2, and each exposed to one of the third or fourth surface, and a first side margin portion 112 and a second side margin portion 113 disposed on the sides of the internal electrodes 121 and 122 exposed on the first surface 1 and the second surface 2.

The plurality of internal electrodes 121 and 122 are formed in the ceramic body 110, and respective edge portions of the plurality of internal electrodes 121 and 122 are exposed to the first surface 1 and the second surface 2 that are the external side surfaces of the ceramic body 110 in the width direction. The first side margin portion 112 and the second side margin portion 113 are disposed on the exposed side portions.

An average thickness of the first side margin portion 112 and the second side margin portion 113 may be 2 μm or more and 10 μm or less.

According to an embodiment, the ceramic body 110 may be comprised of a laminated body in which a plurality of dielectric layers 111 are stacked, a first side margin portion 112 and a second side margin portion 113 each disposed on a respective one of opposing side surfaces of the laminated body, an upper cover portion 114, and a lower cover portion 115.

The plurality of dielectric layers 111 may be in a sintered state and may be integrated such that boundaries between adjacent dielectric layers cannot be identified.

The length of the ceramic body 110 corresponds to the distance from the third surface 3 to the fourth surface 4 of the ceramic body.

The length of the dielectric layer 111 forms the distance between the third surface 3 and the fourth surface 4 of the ceramic body.

According to an embodiment, the length of the ceramic body may be 400 to 1400 μm, and in detail, the length of the ceramic body may be 400 to 800 μm, or 600 to 1400 μm, but are not limited thereto.

The internal electrodes 121 and 122 may be formed on respective dielectric layers 111, and each pair of adjacent internal electrodes 121 and 122 may be formed in the ceramic body with one dielectric layer 111 interposed therebetween by sintering.

Referring to FIG. 3, first internal electrode 121 is formed on the dielectric layer 111. The first internal electrode 121 is not entirely formed in the longitudinal direction of the dielectric layer. For example, one end of the first internal electrode 121 may be formed to remain spaced apart by a predetermined interval from the fourth surface 4 of the ceramic body, and the other end of the first internal electrode 121 may be formed up to the third surface 3 and exposed to the third surface 3.

The end portion of the first internal electrode 121 exposed to the third surface 3 of the ceramic body is connected to the first external electrode 131.

In contrast to the first internal electrode, one end of the second internal electrode 122 is formed to remain spaced apart by a predetermined interval from the third surface 3, and the other end of the second internal electrode 122 is exposed to the fourth surface 4 and connected to the second external electrode 132.

The internal electrodes may be stacked in an amount of 400 or more layers to implement a high capacitance multilayer ceramic capacitor, but an embodiment thereof is not limited thereto.

The dielectric layer 111 may have the same width as that of the first internal electrode 121. For example, the first internal electrode 121 may be formed to extend across a whole width of the dielectric layer 111.

According to an embodiment, the width of the dielectric layer and the width of the internal electrode may be 100 to 900 µm, but an embodiment thereof is not limited thereto. In detail, the width of the dielectric layer and the width of the internal electrode may be 100 to 500 µm, or 100 to 900 µm.

As the ceramic body is further reduced in size, the thickness of the side margin portion may affect the electrical characteristics of the multilayer ceramic capacitor. According to an embodiment of the present disclosure, the side margin portion may have a thickness of 10 µm or less, thereby improving characteristics of the miniaturized multilayer ceramic capacitor.

For example, since the side margin portion is formed to have a thickness of 10 µm or less, a maximum area of an overlapping region of the internal electrodes forming the capacitance may be secured to obtain a high capacitance within a small multilayer ceramic capacitor.

The ceramic body 110 may be comprised of an active portion A serving as a part contributing to the capacitance formation of the capacitor, and an upper cover portion 114 and a lower cover portion 115 formed on upper and lower portions of the active portion A as upper and lower margin portions, respectively.

The active portion A may be formed by repeatedly stacking the plurality of first and second internal electrodes 121 and 122 with the dielectric layer 111 interposed therebetween.

The lower cover portion 115 may have the same material and configuration as those of the dielectric layer 111 except that the lower cover portion 115 does not include an internal electrode.

For example, the lower cover portion 115 may include a ceramic material, for example, a barium titanate ($BaTiO_3$)-based ceramic material.

The lower cover portion 115 may have a thickness of 20 µm or less, but is not limited thereto.

The lower cover portion 115 may be formed by stacking a single dielectric layer or two or more dielectric layers on the lower surface of the active portion A in the thickness direction, and may basically serve to prevent damage to the internal electrodes of the active portion A due to physical or chemical stress.

The upper cover portion 114 is disposed on the upper surface of the active portion A, and may serve to prevent damage to the internal electrodes of the active portion A by physical or chemical stress similarly to the case of the lower cover portion 115.

According to an embodiment, as will be described later, by forming the first side margin portion 112, the second side margin portion 113 and the upper cover portion 114 integrally, the interface junction between the side margin portions and the ceramic body may be reduced, thereby improving reliability.

In detail, in forming the upper cover portion 114 on the upper surface of the active portion A, the first side margin portion 112 and the second side margin portion 113 are formed integrally with the upper cover portion 114, unlike the case in which the lower cover portion 115 is formed by stacking the single dielectric layer or two or more dielectric layers on the lower surface of the active portion A in the thickness direction.

Therefore, the interface junction between the first side margin portion 112, the second side margin portion 113, and the ceramic body 110 may be reduced, thereby improving reliability.

In the related art, in disposing upper cover portion 114 on the upper surface of active portion A, a single dielectric layer or two or more dielectric layers are laminated on the upper surface of the active portion A in the thickness direction similarly to lower cover portion, and the side margin portions are formed separately from the upper cover portion. Therefore, in this case, an interface joint is formed between the side margin portions and the upper cover portion.

As described above, in the related art multilayer ceramic capacitor, since the interface junction is formed between the side margin portion and the upper cover portion, the moisture resistance reliability is poor due to the weakening of bonding force.

However, according to an embodiment of the present disclosure, by forming the first side margin portion 112, the second side margin portion 113, and the upper cover portion 114 integrally with each other, the interface junction between the side margin portions and the ceramic body may be reduced, thereby improving the reliability.

In an embodiment of the present disclosure, since the internal electrodes and the dielectric layers are formed by being cut at the same time, the width of the internal electrode and the width of the dielectric layer may be the same, which will be described in more detail later.

In this embodiment, the width of the dielectric layer is formed to be the same as that of the internal electrode, and thus edges of the internal electrodes 121 and 122 may be exposed to the first and second surfaces in the width direction of the ceramic body 110.

A first side margin portion 112 and a second side margin portion 113 may be formed on the opposing side surfaces of the ceramic body 110 to which the edges of the internal electrodes 121 and 122 are exposed. At the same time, the upper cover portion 114 may be formed on the fifth surface of the ceramic body 110 in the thickness direction.

The thickness of the first side margin portion 112 and the second side margin portion 113 may be 10 µm or less. As the thickness of the first side margin portion 112 and the second side margin portion 113 is reduced, the area of overlap of the internal electrodes formed in the ceramic body may be increased.

The thickness of the first side margin portion 112 and the second side margin portion 113 is not particularly limited as long as it has a thickness that may prevent a short of the internal electrode exposed to the side of the ceramic body 110. For example, the thicknesses of the first side margin portion 112 and the second side margin portion 113 may be 2 µm or more.

If the thickness of the first and second side margin portions is less than 2 µm, mechanical strength against external impacts may be reduced. If the thickness of the first and second side margin portions is more than 10 µm, the area of overlap of the internal electrodes may be relatively reduced, and thus, securing the high capacity of the multilayer ceramic capacitor may be difficult.

To significantly increase the capacity of a multilayer ceramic capacitor, a method of thinning the dielectric layer, a method of high lamination of the thinned dielectric layer, a method of improving the coverage of the internal electrode, and the like may be considered.

In addition, a method of improving the area of overlap of the internal electrodes forming the capacitance may be considered.

To increase the area of overlap of the internal electrodes, the margin area in which the internal electrodes are not formed should be significantly reduced.

In detail, as the size of the multilayer ceramic capacitor is further reduced, the margin area should be significantly reduced to increase the area of overlap of the internal electrodes.

According to this embodiment, the internal electrode is formed in the entire width direction region of the dielectric layer, and the thickness of the side margin portion is set to be 10 µm or less, so that the area of overlap of the internal electrodes is relatively increased.

In general, the thicknesses of the dielectric layer and the internal electrode become relatively thinner as the number of dielectric layers and internal electrodes is increased. Therefore, a phenomenon in which the internal electrode is shorted may occur frequently. In addition, when the internal electrode is formed only on a portion of the dielectric layer, a step may occur due to the internal electrode, thereby degrading the accelerated lifespan or reliability of the insulation resistance.

However, according to this embodiment of the present disclosure, even when the internal electrode and the dielectric layer are formed of a relatively thin film, since the internal electrode is formed entirely in the width direction of the dielectric layer, the area of overlap of the internal electrode may be increased to increase the capacitance of the multilayer ceramic capacitor.

In addition, a multilayer ceramic capacitor having excellent capacitance characteristics and excellent reliability may be provided by reducing the step difference caused by the internal electrodes to improve the accelerated lifespan of the insulation resistance.

According to an embodiment, the first side margin portion 112 and the second side margin portion 113 have a dielectric composition different from that of one of the upper cover portion 114 and the lower cover portion 115.

In detail, according to an embodiment, the first side margin portion 112 and the second side margin portion 113 are characterized in that they have the dielectric composition different from that of the lower cover portion 115.

As described above, in forming the upper cover portion 114 on the upper surface of the active portion A, unlike the lower cover portion 115 formed by stacking the single dielectric layer or two or more dielectric layers on the lower surface of the active portion A in the thickness direction, the first side margin portion 112 and the second side margin portion 113 may be formed integrally with the upper cover portion 114. For example, the first side margin portion 112, the second side margin portion 113, and the upper cover portion 114 may be formed as part of a same process step and using a same material or composition such that no border exists therebetween.

Accordingly, the lower cover portion 115 may have the same composition as the dielectric composition of the dielectric layer 111 of the active portion A, while having the dielectric composition different from that of the first side margin portion 112 and the second side margin portion 113.

On the other hand, since the upper cover portion 114 is formed integrally with the first side margin portion 112 and the second side margin portion 113, the dielectric composition of the upper cover portion 114 may be the same as the dielectric composition of the first side margin portion 112 and the second side margin portion 113.

According to an embodiment, the interface junction between the side margin portions 112 and 113 and the ceramic body 110 may be reduced by integrally forming the first side margin portion 112, the second side margin portion 113, and the upper cover portion 114, thereby improving the reliability.

In addition, by controlling the dielectric composition of the first side margin portion 112, the second side margin portion 113, and the upper cover portion 114, to be different from the dielectric composition of the dielectric layer 111 and the active portion A and the lower cover portion 115, the reliability may be improved.

According to an embodiment, the upper cover portion 114 and the lower cover portion 115 may have a different dielectric composition from each other.

The dielectric composition of the lower cover portion 115 may be the same as the dielectric composition of the dielectric layer 111 of the active portion A, but may be different from the dielectric composition of the upper cover portion 114.

For example, since the upper cover portion 114 is formed integrally with the first side margin portion 112 and the second side margin portion 113, the dielectric composition of the upper cover portion 114 may be different from the dielectric composition of the lower cover portion 115.

On the other hand, the dielectric layer 111 of the active portion A and one of the upper cover portion 114 and the lower cover portion 115 may have different dielectric compositions.

In detail, according to an embodiment, the dielectric layer 111 of the active portion A may have a dielectric composition different from that of the upper cover portion 114.

As described above, since the upper cover portion 114 is formed integrally with the first side margin portion 112 and the second side margin portion 113, the dielectric composition of the upper cover portion 114 may be different from the dielectric composition of the dielectric layer 111 of the active portion A.

According to an embodiment, in the case of the upper and lower side ceramic parts of the ceramic body 110, the side ceramic parts from an outermost (e.g., upper-most or lower-most) internal electrode 121 or 122 among the plurality of internal electrodes 121 and 122 to one of the fifth surface 5 and the sixth surface 6 is the upper cover portion 114 or the lower cover portion 115. The side ceramic part-region, which is the upper cover portion 114 or the lower cover portion 115, may have a dielectric composition different from that of the first and second side margin portions 112 and 113, which are the remaining regions.

In detail, among the side ceramic parts of the ceramic body 110, the side ceramic part-region which corresponds to a region from the outermost (e.g., lower-most) internal electrode 121 or 122 among the plurality of internal electrodes 121 and 122 to the sixth surface 6 of the ceramic body 110, is the lower cover portion 115, and the side ceramic part-region which is the lower cover portion 115 has a dielectric composition different from the first and second side margin portions 112 and 113 which are the remaining regions.

According to an embodiment, the content of magnesium (Mg) included in the first and second side margin portions 112 and 113 may be more than the content of magnesium (Mg) included in one of the upper cover portion 114 and the lower cover portion 115.

In detail, the content of magnesium (Mg) included in the first and second side margin portions 112 and 113 may be greater than the content of magnesium (Mg) included in the lower cover portion 115.

By controlling the content of magnesium (Mg) included in the first and second side margin portions 112 and 113 to be greater than the content of magnesium (Mg) included in the lower cover portion 115, an insulation breakdown voltage may increase, thereby improving reliability.

By controlling the content of magnesium (Mg) included in the first side margin portion 112 and the second side margin portion 113 adjacent to the internal electrodes 121 and 122 exposed to the first surface 1 and the second surface 2 of the ceramic body 110, the length of edge oxide layer of the internal electrodes 121 and 122 exposed to the side of the ceramic body 110 in the width direction may be controlled, and thus, the breakdown voltage (BDV) may be increased, and the moisture resistance reliability may be improved.

In general, in the process of forming side margin portions, a large number of voids are generated at the interface between the ceramic body and the side margin portions, thereby reducing reliability.

In addition, electric field concentration occurs due to voids generated at the interface between the ceramic body and the side margin portions, thereby causing a problem of lowering the breakdown voltage (BDV).

In addition, the voids may cause a decrease in moisture resistance reliability due to a decrease in outer sintered densities.

According to an embodiment, by adjusting the content of magnesium (Mg) included in the first and second side margin portions 112 and 113 (and in the upper cover portion 114) to be greater than that of magnesium (Mg) included in the lower cover portion 115, an oxide layer may be formed on the voids generated at the interface at which the ceramic body 110 and the side margin portions 112 and 113 contact each other.

As described above, when the oxide layer is formed on the voids formed at the interface between the ceramic body 110 and the side margin portions 112 and 113, the concentration of the electric field may be alleviated by securing the insulation, and thus, breakdown voltage (BDV) may increase and failure such a short circuit may decrease.

A method of controlling the content of magnesium (Mg) included in the first and second side margin portions 112 and 113 to be greater than that of magnesium (Mg) included in the lower cover portion 115 may be performed by controlling the dielectric composition for the formation of the ceramic body and the dielectric composition for the formation of the first and second side margin portions differently from each other during a process of fabricating a multilayer ceramic capacitor.

For example, unlike the dielectric composition for forming the ceramic body (e.g., including dielectric layers 111), by increasing the content of magnesium (Mg) in the dielectric composition for the formation of the first and second side margin portions 112 and 113 (and for the formation of the upper cover portion 114), the amount of magnesium (Mg) included in the first and second side margin portions 112 and 113 may be adjusted to be more than the amount of magnesium (Mg) included in the lower cover portion 115 formed with the same composition as the dielectric composition for the formation of the ceramic body.

On the other hand, the content of magnesium (Mg) included in the upper cover portion 114 may be greater than that of magnesium (Mg) included in the lower cover portion 115.

As described above, since the upper cover portion 114 is formed integrally with the first side margin portion 112 and the second side margin portion 113, the upper cover portion 114 includes the content of magnesium (Mg) greater than that of magnesium (Mg) included in the lower cover portion 115.

According to an embodiment, the content of magnesium (Mg) included in one of the upper cover portion 114 and the lower cover portion 115 may be greater than the content of magnesium (Mg) included in the dielectric layer 111 of the active portion A.

In detail, the content of magnesium (Mg) included in the upper cover portion 114 may be greater than the content of magnesium (Mg) included in the dielectric layer 111 of the active portion A.

Since the upper cover portion 114 is formed integrally with the first side margin portion 112 and the second side margin portion 113, the content of magnesium (Mg) included in the upper cover portion 114 may be greater than the content of magnesium (Mg) included in the dielectric layer 111 of the active portion A.

According to an embodiment, the content of magnesium (Mg) of the first and second side margin portions 112 and 113 and the upper cover portion 114 may be 10 mols or more and 30 mols or less with respect to 100 mols of titanium (Ti) included in the first and second side margin portions and the upper cover portion.

By controlling the amount of magnesium (Mg) of the first and second side margin portions 112 and 113 and the upper cover portion 114, to be 10 moles or more and 30 moles or less with respect to 100 moles of titanium (Ti) included in the first and second side margin portions and the upper cover portion, breakdown voltage (BDV) and moisture resistance reliability may be increased.

If the amount of magnesium (Mg) of the first and second side margin portions 112 and 113 and the upper cover portion 114 is less than 10 moles with respect to 100 moles of titanium (Ti) included in the first and second side margin portions and the upper cover portion, the formation of the oxide layer on the voids formed at the interface between the ceramic body and the side margin portions may be insufficient, and thus, the breakdown voltage (BDV) may be lowered and defects such as short circuits may increase.

On the other hand, if the amount of magnesium (Mg) of the first and second side margin portions 112 and 113 and the upper cover portion 114 is more than 30 moles with respect to 100 moles of titanium (Ti) included in the first and second side margin portions and the upper cover portion, a problem such as uneven distribution of breakdown voltage (BDV) and reliability may occur due to deterioration of sinterability.

However, the amount as described above is not necessarily limited, and the content may vary depending on the product design.

According to an embodiment, a micro-multilayer ceramic capacitor in which the thickness of the dielectric layer 111 is 0.4 μm or less and the thickness of the internal electrodes 121 or 122 is 0.4 μm or less is provided.

As in an embodiment, when the dielectric layer and the internal electrode of the thin film in which the thickness of the dielectric layer 111 is 0.4 μm or less and the thickness of the internal electrodes 121 or 122 is 0.4 μm or less, are applied, bond strength degradation and moisture resistance reliability problems occurring at the bonding interface of the margin portions are significantly important issues.

In an embodiment, even in the case of a thin film, in which the dielectric layer 111 and the first and second internal electrodes 121 and 122 is 0.4 μm or less, by integrally forming the first side margin portion 112, the second side margin portion 113, and the upper cover portion 114 with each other, the interfacial junction between the side margin portions and the ceramic body may be reduced, thereby improving reliability.

However, the thin film does not necessarily mean that the thickness of the dielectric layer 111 and the first and second internal electrodes 121 and 122 is 0.4 μm or less, and may be understood as more generally including a dielectric layer and an internal electrode having a thickness thinner than that of related art products.

FIGS. 5A to 5D are cross-sectional views and perspective views schematically illustrating a method of manufacturing a multilayer ceramic capacitor according to another embodiment.

According to another embodiment, a method of manufacturing a multilayer ceramic capacitor includes preparing a first ceramic green sheet on which a plurality of first internal electrode patterns are formed at a predetermined interval and a second ceramic green sheet on which a plurality of second internal electrode patterns are formed at a predetermined interval, laminating the first ceramic green sheet and the second ceramic green sheet in such a manner that the plurality of first internal electrode patterns and the plurality of second internal electrode patterns overlap each other and forming a ceramic green sheet laminated body in which a lower cover portion is formed by laminating a plurality of ceramic green sheets on a lower portion of a laminated body, cutting the ceramic green sheet laminated body to have side surfaces to which edges of the plurality of first internal electrode patterns and the plurality of second internal electrode patterns are exposed in a width direction, forming a first side margin portion, a second side margin portion, and an upper cover portion on the side surfaces to which the edges of the plurality of first internal electrode patterns and the plurality of second internal electrode patterns are exposed and on the laminated body, and firing the cut laminated body to provide a ceramic body including an active portion having a dielectric layer and first and second internal electrodes, and a lower cover portion. The forming of the first side margin portion, the second side margin portion, and the upper cover portion is undertaken by adding a ceramic material to integrally form the first side margin portion, the second side margin portion, and the upper cover portion.

Hereinafter, a method of manufacturing a multilayer ceramic capacitor according to another embodiment will be described.

Figure 5A:
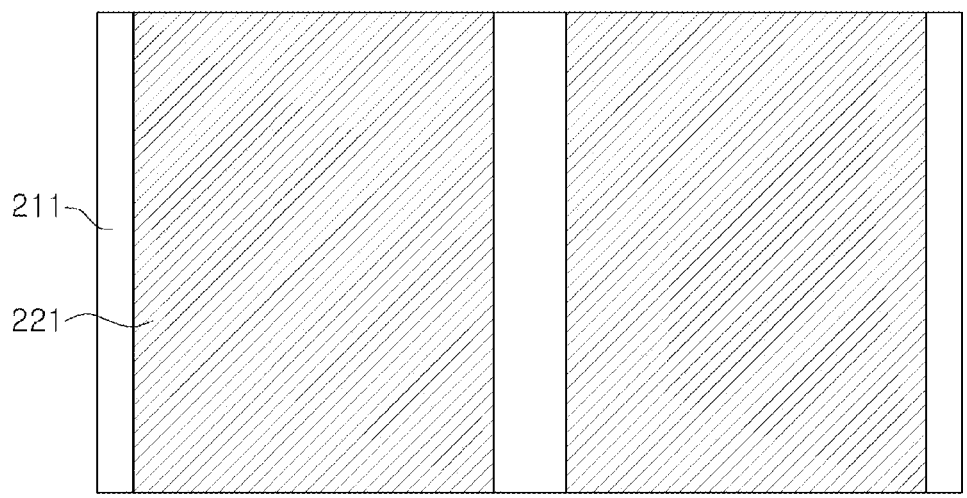
FIGS. 5A to 5D are cross-sectional and perspective views schematically illustrating a method of manufacturing a multilayer ceramic capacitor according to another embodiment of the present disclosure.

As illustrated in FIG. 5A, a plurality of stripe-type first internal electrode patterns 221 are formed to be spaced apart from each other at a predetermined interval on a ceramic green sheet 211. The plurality of stripe-type first internal electrode patterns 221 may be formed in parallel to each other.

The ceramic green sheet 211 may be formed of a ceramic paste including a ceramic powder, an organic solvent, and an organic binder.

The ceramic powder is a material having a high dielectric constant and may be a barium titanate ($BaTiO_3$)-based material, a lead composite perovskite-based material, a strontium titanate ($SrTiO_3$)-based material or the like, but is not limited thereto. In detail, barium titanate ($BaTiO_3$)-based powder may be used. When the ceramic green sheet 211 is fired, the ceramic green sheet 211 becomes a dielectric layer 111 constituting the ceramic body 110.

The stripe-type first internal electrode patterns 221 may be formed by an internal electrode paste including a conductive metal. The conductive metal may be nickel (Ni), copper (Cu), palladium (Pd), or alloys thereof, but is not limited thereto.

The method of forming the stripe-type first internal electrode patterns 221 on the ceramic green sheet 211 is not particularly limited, but may be formed by, for example, a printing method such as a screen-printing method or a gravure printing method.

Although not illustrated, a plurality of stripe-type second internal electrode patterns 222 may similarly be formed on another ceramic green sheet 211 at a predetermined interval.

Hereinafter, the ceramic green sheet on which the first internal electrode patterns 221 are formed may be referred to as a first ceramic green sheet, and the ceramic green sheet on which the second internal electrode patterns 222 are formed may be referred to as a second ceramic green sheet.

Figure 5B:
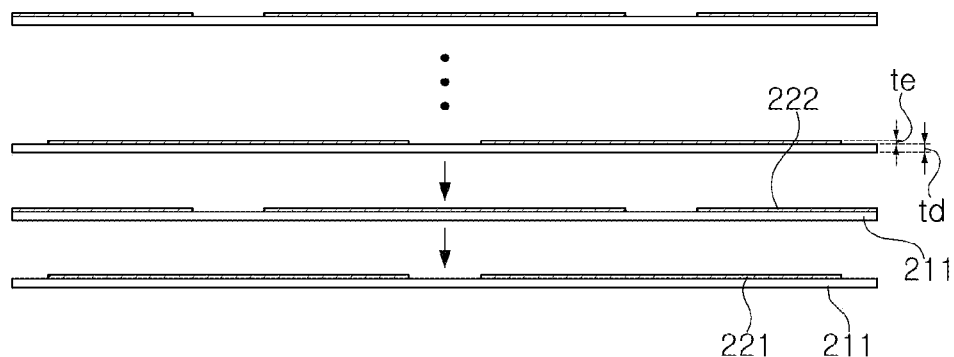

Next, as illustrated in FIG. 5B, the first and second ceramic green sheets may be alternately stacked in such a manner that the striped first internal electrode patterns 221 and the striped second internal electrode patterns 222 are alternately stacked to overlap each other with the spacings between adjacent patterns offset from each other.

Thereafter, the stripe-type first internal electrode pattern 221 may be a first internal electrode 121, and the stripe-type second internal electrode pattern 222 may be a second internal electrode 122.

According to another embodiment, a thickness td of each of the first and second ceramic green sheets is 0.6 μm or less, and a thickness te of each of the first and second internal electrode patterns is 0.5 μm or less.

Since an embodiment of the present disclosure is characterized by a very small high capacity multilayer ceramic capacitor having a thin film, in which a dielectric layer has a thickness of 0.4 μm or less and an internal electrode has a thickness of 0.4 μm or less, the thickness td of the first and second ceramic green sheets prior to firing is 0.6 μm or less, and the thickness te of the first and second internal electrode patterns prior to firing is 0.5 μm or less.

Figure 5C:
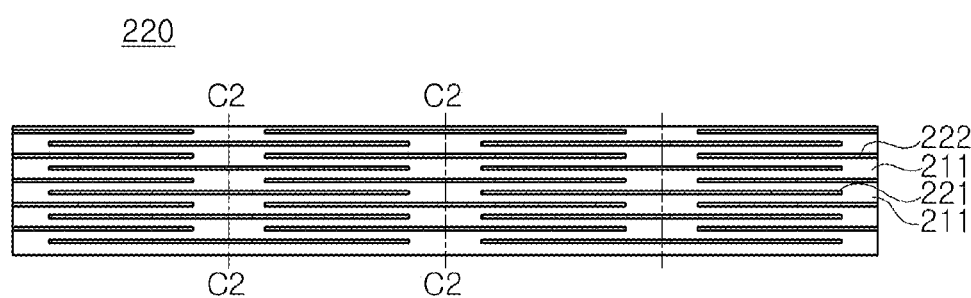
Figure 5D:
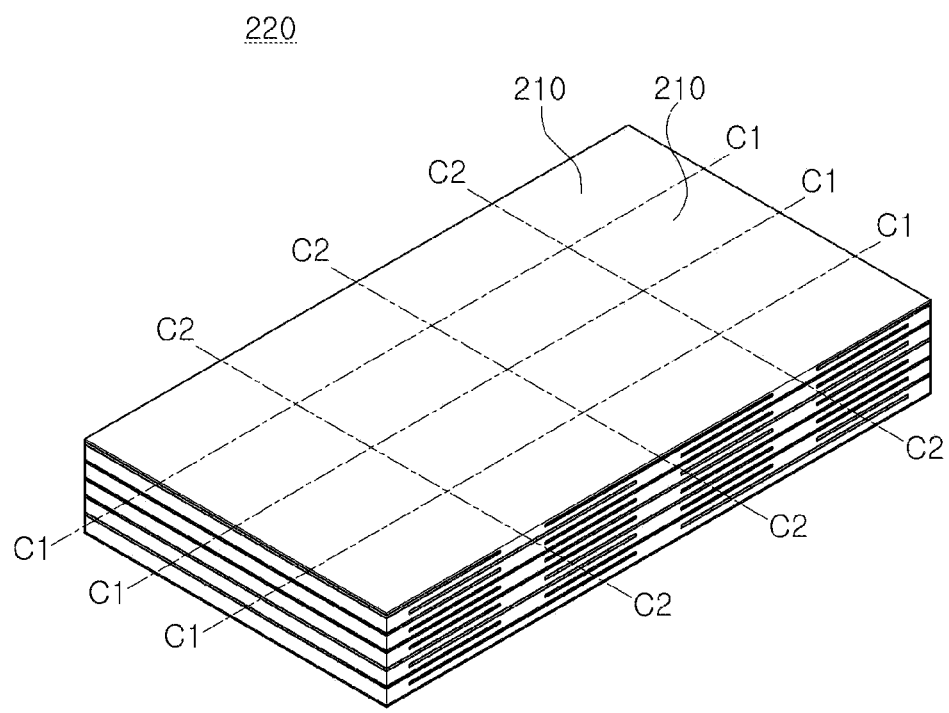

FIG. 5C is a cross-sectional view illustrating a ceramic green sheet laminated body 220 in which first and second ceramic green sheets are stacked according to an embodiment, and FIG. 5D is a perspective view of the ceramic green sheet laminated body 220 in which the first and second ceramic green sheets are stacked.

Referring to FIGS. 5C and 5D, a first ceramic green sheet on which a plurality of parallel stripe-type first internal electrode patterns 221 are printed and a second ceramic green sheet on which a plurality of parallel stripe-type second internal electrode patterns 222 are printed are stacked alternately.

In detail, the first ceramic green sheet and the second ceramic green sheet may be stacked in such a manner that central portions of the stripe-type first internal electrode patterns 221 printed on the first ceramic green sheet overlap with gaps between the stripe-type second internal electrode patterns 222 printed on the second ceramic green sheet.

The first ceramic green sheet and the second ceramic green sheet are stacked to allow the first internal electrode patterns 221 and the second internal electrode patterns 222 to overlap each other, and a plurality of ceramic green sheets are disposed on a lower portion of the laminated body to form the ceramic green sheet laminated body 220 on which a lower cover portion has been formed.

Next, as illustrated in FIG. 5D, the ceramic green sheet laminated body 220 may be cut across the plurality of stripe-type first internal electrode patterns 221 and stripe-type second internal electrode patterns 222. For example, the ceramic green sheet laminated body 220 may become laminated bodies 210 provided by being cut along C1-C1 and C2-C2 cutting lines orthogonal to each other.

In detail, the stripe-type first internal electrode patterns 221 and the stripe-type second internal electrode patterns 222 may be cut in a length direction and divided into a plurality of multilayer bodies having a bar shape with a predetermined width. At this time, the laminated ceramic green sheets are also cut together with the internal electrode patterns. Accordingly, the dielectric layer may be formed to have the same width as that of the internal electrode.

The cutting may be performed to fit individual ceramic body sizes along the C2-C2 cutting line. For example, before forming a first side margin portion and a second side margin portion, a plurality of the laminated bodies 210 may be formed by performing cutting into the bar-shaped laminated bodies or by cutting the bar-shaped laminated body into individual ceramic body sizes along the C2-C2 cutting line.

For example, the bar-shaped laminated body may be cut in such a manner that central portions of overlapping first internal electrodes and predetermined gaps formed between second internal electrodes are cut by the same cutting line. Accordingly, ends of the first internal electrode and the second internal electrode may be respectively exposed on opposing cut surfaces.

Thereafter, the first side margin portion and the second side margin portion may be formed on first and second side surfaces of the laminated body 210, and at the same time, an upper cover portion may be formed on an upper surface of the laminated body 210.

Figure 6A:
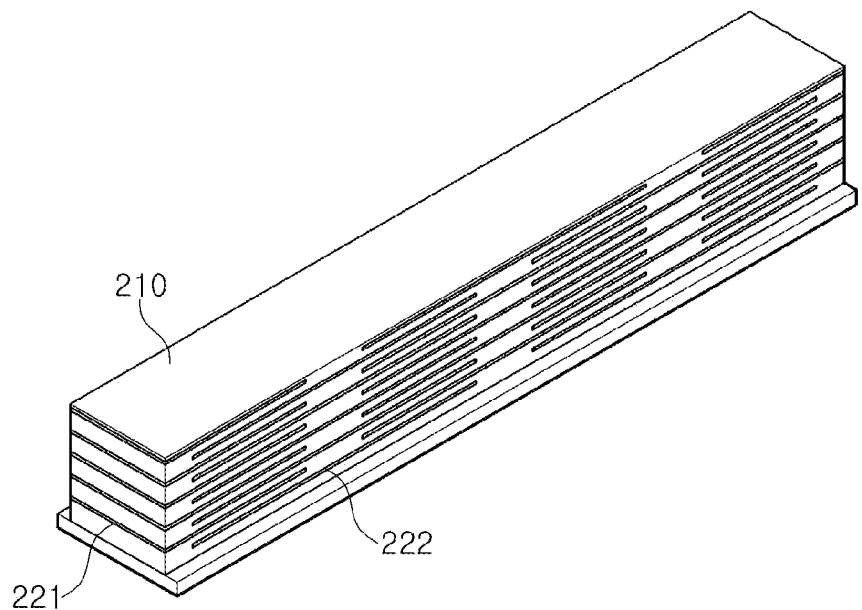
FIGS. 6A to 6B are perspective views schematically illustrating a method of manufacturing a multilayer ceramic capacitor according to a first embodiment.
Figure 6B:
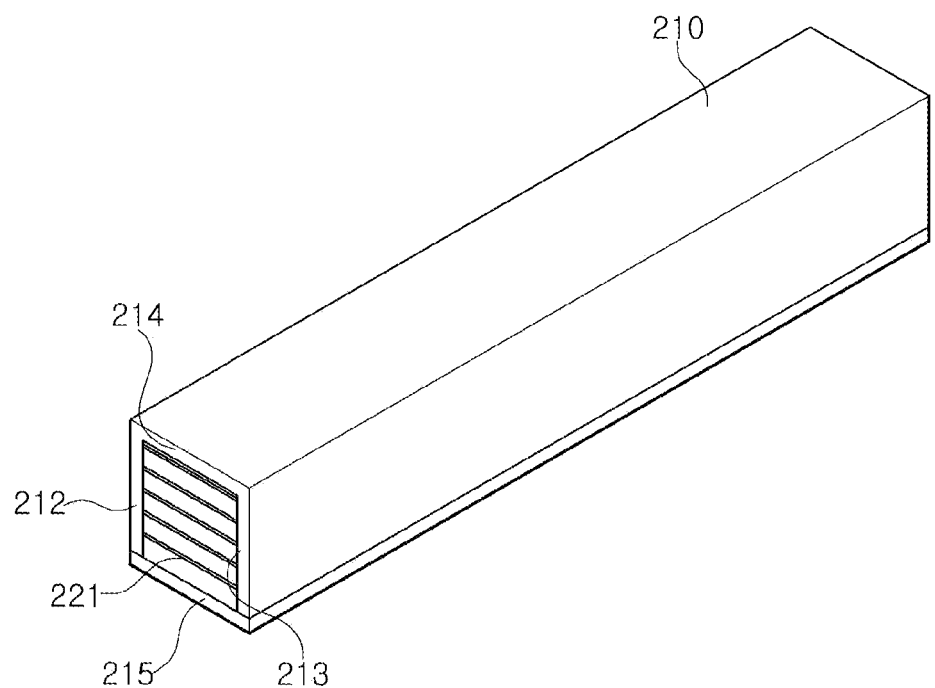

FIGS. 6A to 6B are perspective views schematically illustrating a method of manufacturing a multilayer ceramic capacitor according to a first embodiment.

Referring to FIGS. 6A and 6B, a method of manufacturing a multilayer ceramic capacitor according to the first embodiment includes preparing a bar-shaped laminated body 210 formed to have a width extended by the distance between the side margins, and integrally forming the first side margin portion, the second side margin portion, and an upper cover portion onside surfaces to which edges of the first internal electrode patterns 221 and the second internal electrode patterns 222 are exposed and on an upper portion of the laminated body 210.

Next, the multilayer body 210 is cut and fired to form a ceramic body 110 including an active portion A that includes a dielectric layer 111 and first and second internal electrodes 121 and 122, a lower cover portion 115, a first side margin portion 112, a second side margin portion 113, and an upper cover portion 114.

According to the first embodiment, the forming the first side margin portion 212, the second side margin portion 213, and the upper cover portion 214 may be performed by adding a ceramic material to form the first side margin portion 212, the second side margin portion 213, and the upper cover portion 214 integrally with each other.

In addition, according to the first embodiment, unlike a second embodiment to be described later, the first side margin portion 212, the second side margin portion 213, and the upper cover portion 214 are formed integrally by adding a ceramic material to the bar-shaped laminated body 210.

The forming of the first side margin portion 212, the second side margin portion 213, and the upper cover portion 214 may be performed by injecting a ceramic slurry or compressing a dielectric sheet onto the bar-shaped laminated body 210.

In pressing the dielectric sheet against the bar-shaped laminated body 210, the dielectric sheet having relatively high fluidity may be used.

In the cutting of the ceramic green sheet laminated body 210, the lower cover portion 215 may be cut up to an area thereof corresponding to the width of the first side margin portion 212 and the second side margin portion 213.

For this reason, the lower cover portion 215 may be formed to have a width extended by the width of the first side margin portion 212 and the second side margin portion 213 relative to the width of the laminated body 210.

Figure 7A:
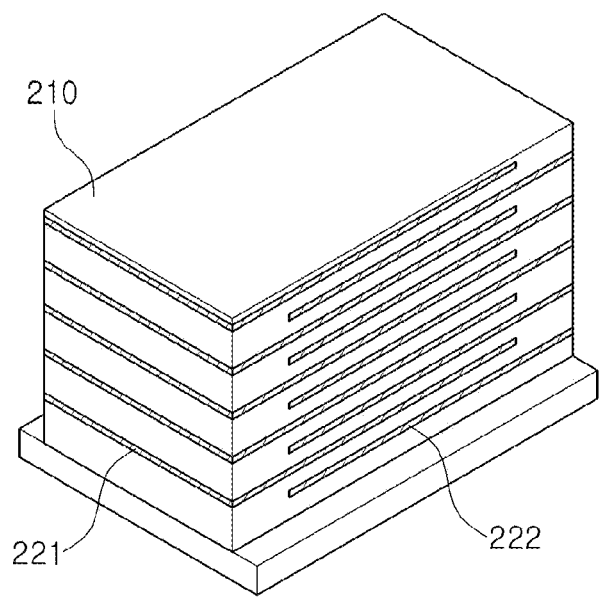
FIGS. 7A to 7B are perspective views schematically illustrating a method of manufacturing a multilayer ceramic capacitor according to a second embodiment.
Figure 7B:
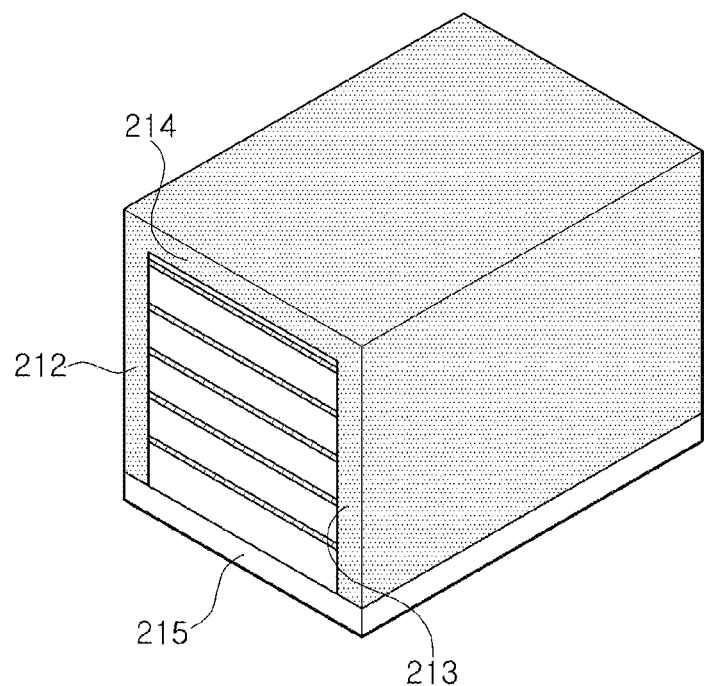

FIGS. 7A to 7B are perspective views schematically illustrating a method of manufacturing a multilayer ceramic capacitor according to a second embodiment.

Referring to FIGS. 7A and 7B, according to the second embodiment, forming the first side margin portion 212, the second side margin portion 213, and the upper cover portion 214 may be performed in a state of a plurality of stacked chips formed by cutting the ceramic green sheet laminated body 210.

Since the method of manufacturing a multilayer ceramic capacitor according to the second embodiment is generally similar to the method of manufacturing a multilayer ceramic capacitor according to the first embodiment described above, except that the first side margin portion 212, the second side margin portion 213, and the upper cover portion 214 are integrally formed in a state of a plurality of stacked chips, a detailed description thereof will be omitted.

Thereafter, external electrodes may be formed on the third side surface of the ceramic body to which the first internal electrode is exposed and on the fourth side surface of the ceramic body to which the second internal electrode is exposed, respectively.

In addition, the description of the same parts as the features in the above-described embodiment will be omitted herein to avoid duplication.

As set forth above, according to an embodiment, by forming the first side margin portion, the second side margin portion, and the upper cover portion integrally, the interface junction between the side margin portion and the body may be reduced, and the reliability may be improved.

In addition, by controlling the dielectric composition of the first side margin portion, the second side margin portion, and the upper cover portion to be different from the dielectric composition of the dielectric layer of the active portion and the lower cover portion, reliability may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:
1. A multilayer ceramic capacitor comprising:
   a ceramic body including a plurality of dielectric layers, the ceramic body having first and second surfaces opposing each other, third and fourth surfaces opposing each other and connecting the first and second surfaces, and fifth and sixth surfaces opposing each other and connected to the first to fourth surfaces;
   a plurality of internal electrodes disposed inside the ceramic body to overlap each other with the dielectric layer interposed therebetween, and each exposed to the first and second surfaces and to one of the third and fourth surfaces; and a first side margin portion and a second side margin portion disposed on sides of the plurality of internal electrodes exposed to the first and second surfaces, wherein the ceramic body includes an active portion including the plurality of internal electrodes disposed to overlap each other with the dielectric layers respectively interposed therebetween to form capacitance, an upper cover portion disposed above the active portion, and a lower cover portion disposed below the active portion and including a mounting surface, wherein a content of magnesium (Mg) included in the first or second side margin portion is greater than a content of magnesium (Mg) included in one of the upper cover portion or the lower cover portion, wherein at least one of the plurality of internal electrodes has an average thickness of 0.4 µm or less, and wherein the dielectric layers of the active portion and the lower cover portion have different dielectric compositions.

2. The multilayer ceramic capacitor of claim 1, wherein the upper cover portion has a different dielectric composition than the lower cover portion.

3. The multilayer ceramic capacitor of claim 1, wherein in a side surface of the multilayer ceramic capacitor parallel to the first surface, a first part adjacent to one of the fifth and sixth surfaces of the ceramic body has a dielectric composition different from a second part forming the first or second side margin portion.

4. The multilayer ceramic capacitor of claim 1, wherein the content of magnesium (Mg) included in the first and second side margin portions is greater than the content of magnesium (Mg) included in one of the upper cover portion or the lower cover portion.

5. The multilayer ceramic capacitor of claim 1, wherein the content of magnesium (Mg) included in the upper cover portion is greater than the content of magnesium (Mg) included in the lower cover portion.

6. The multilayer ceramic capacitor of claim 1, wherein the content of magnesium (Mg) included in one of the upper cover portion and the lower cover portion is greater than a content of magnesium (Mg) included in the dielectric layers of the active portion.

7. The multilayer ceramic capacitor of claim 1, wherein the content of magnesium (Mg) included in the first and second side margin portions is greater than a content of magnesium (Mg) included in the dielectric layers of the active portion.

8. The multilayer ceramic capacitor of claim 1, wherein the content of magnesium included in the first and second side margin portions is 10 mol or more and 30 mol or less with respect to 100 mol of titanium (Ti) included therein.

9. The multilayer ceramic capacitor of claim 1, wherein the content of magnesium included in the upper cover portion is 10 mol or more and 30 mol or less with respect to 100 mol of titanium (Ti) included therein.

10. The multilayer ceramic capacitor of claim 1, wherein at least one of the plurality of dielectric layers has an average thickness of 0.4 µm or less.

11. The multilayer ceramic capacitor of claim 1, wherein a thickness of the first and second side margin portions is 10 µm or less, respectively.

12. A multilayer ceramic capacitor comprising:

a ceramic body including a plurality of dielectric layers, the ceramic body having first and second surfaces opposing each other, third and fourth surfaces opposing each other and connecting the first and second surfaces, and fifth and sixth surfaces opposing each other and connected to the first to fourth surfaces;

a plurality of internal electrodes disposed inside the ceramic body to overlap each other with the dielectric layer interposed therebetween, and each exposed to the first and second surfaces and to one of the third and fourth surfaces; and a first side margin portion and a second side margin portion disposed on sides of the plurality of internal electrodes exposed to the first and second surfaces, wherein the ceramic body includes an active portion including the plurality of internal electrodes disposed to overlap each other with the dielectric layers respectively interposed therebetween to form capacitance, an upper cover portion disposed above the active portion, and a lower cover portion disposed below the active portion and including a mounting surface, wherein a content of magnesium (Mg) included in the first or second side margin portion is greater than a content of magnesium (Mg) included in the dielectric layers of the active portion, wherein at least one of the plurality of internal electrodes has an average thickness of 0.4 µm or less, and wherein the dielectric layers of the active portion and the lower cover portion have different dielectric compositions.

13. The multilayer ceramic capacitor of claim 12, wherein the upper cover portion has a different dielectric composition than the lower cover portion.

14. The multilayer ceramic capacitor of claim 12, wherein in a side surface of the multilayer ceramic capacitor parallel to the first surface, a first part adjacent to one of the fifth and sixth surfaces of the ceramic body has a dielectric composition different from a second part forming the first or second side margin portion.

15. The multilayer ceramic capacitor of claim 12, wherein the content of magnesium (Mg) included in the first and second side margin portions is greater than the content of magnesium (Mg) included in one of the upper cover portion or the lower cover portion.

16. The multilayer ceramic capacitor of claim 12, wherein a content of magnesium (Mg) included in the upper cover portion is greater than a content of magnesium (Mg) included in the lower cover portion.

17. The multilayer ceramic capacitor of claim 12, wherein a content of magnesium (Mg) included in one of the upper cover portion and the lower cover portion is greater than the content of magnesium (Mg) included in the dielectric layers of the active portion.

18. The multilayer ceramic capacitor of claim 12, wherein the content of magnesium (Mg) included in the first and second side margin portions is greater than the content of magnesium (Mg) included in the dielectric layers of the active portion.

19. The multilayer ceramic capacitor of claim 12, wherein a content of magnesium in the first and second side margin portions is 10 mol or more and 30 mol or less with respect to 100 mol of titanium (Ti) included therein.

20. The multilayer ceramic capacitor of claim 12, wherein a content of magnesium in the upper cover portion is 10 mol or more and 30 mol or less with respect to 100 mol of titanium (Ti) included therein.

21. The multilayer ceramic capacitor of claim 12, wherein at least one of the plurality of dielectric layers has an average thickness of 0.4 µm or less.

22. The multilayer ceramic capacitor of claim 12, wherein a thickness of the first and second side margin portions is 10 μm or less, respectively.

23. The multilayer ceramic capacitor of claim 12, wherein the first and second side margin portions have a dielectric composition different from a dielectric composition of one of the upper cover portion and the lower cover portion.

* * * * *